United States Patent
Good

(10) Patent No.: US 8,668,149 B2
(45) Date of Patent: Mar. 11, 2014

(54) BAR CODE READER TERMINAL AND METHODS FOR OPERATING THE SAME HAVING MISREAD DETECTION APPARATUS

(75) Inventor: Timothy Good, Clementon, NJ (US)

(73) Assignee: Metrologic Instruments, Inc., Blackwood, NJ (US)

( * ) Notice: Subject to any disclaimer, the term of this patent is extended or adjusted under 35 U.S.C. 154(b) by 398 days.

(21) Appl. No.: 12/561,108

(22) Filed: Sep. 16, 2009

(65) Prior Publication Data

US 2011/0062238 A1    Mar. 17, 2011

(51) Int. Cl.
*G06K 7/10*    (2006.01)

(52) U.S. Cl.
USPC ............... 235/462.16; 235/437; 235/462.19; 235/462.25

(58) Field of Classification Search
USPC ............ 235/462.25, 462, 437, 438, 462.01, 235/462.06, 462.1, 462.16, 462.19, 462.29
See application file for complete search history.

(56) References Cited

U.S. PATENT DOCUMENTS

| | | | |
|---|---|---|---|
| 3,886,521 A * | 5/1975 | Dobras | 235/437 |
| 4,224,508 A | 9/1980 | Kao | |
| 5,326,961 A | 7/1994 | Sibata | |
| 5,404,004 A | 4/1995 | Sato et al. | |
| 5,942,740 A * | 8/1999 | Watanabe et al. | 235/462.07 |
| 5,979,765 A | 11/1999 | Watanabe et al. | |
| 6,102,295 A | 8/2000 | Ogami | |
| 6,145,745 A | 11/2000 | Hauser et al. | |
| 6,247,646 B1 | 6/2001 | Iwaguchi et al. | |
| 6,299,064 B2 | 10/2001 | Watanabe et al. | |
| 6,547,143 B2 | 4/2003 | Koyanagi et al. | |
| 6,612,491 B1 | 9/2003 | Iwaguchi et al. | |
| 7,007,847 B2 | 3/2006 | Iwaguchi et al. | |
| 2003/0071124 A1 | 4/2003 | Tsikos et al. | |
| 2006/0097054 A1* | 5/2006 | Biss et al. | 235/462.45 |
| 2006/0113387 A1 | 6/2006 | Baker et al. | |

* cited by examiner

*Primary Examiner* — Michael G Lee
*Assistant Examiner* — Tabitha Chedekel
(74) *Attorney, Agent, or Firm* — Addition, Higgins, Pendleton & Ashe, P.A.

(57) ABSTRACT

Misreads in decodable indicia by terminals such as bar code scanners (e.g., laser, image sensors) can occur. Solutions can include increasing redundancy or screening out erroneous data. Embodiments of screening error reduction circuits, terminals, and/or methods for processing decodable indicia data are provided.

13 Claims, 7 Drawing Sheets

BAR CODE READER TERMINAL AND METHODS FOR OPERATING THE SAME HAVING MISREAD DETECTION APPARATUS

FIELD OF THE INVENTION

The application relates to data terminals in general and more specifically to optical scanning systems or image sensor based data terminals capable of obtaining decodable indicia and frames of image data, and more particularly to a circuits or methods that can increase performance of the same.

BACKGROUND OF THE INVENTION

Various optical scanning apparatus have been developed to read and decode optical indicia, such as bar code symbols on a target such as a label. Laser type scanners can measure reflected light of a specific frequency output from the scanner itself. Image sensor based indicia reading terminals have been used for a number of years for purposes of decoding information encoded in bar code symbols. Decoding decodable indicia such as bar codes has always proved challenging, in part because decoding systems work best with a sharp representation of the bar code symbol, and a sharp representation is not always possible. Optical, environmental, or physical factors can cause the representation to be out of focus, too close to the reader, or too far away from the reader. Further, bar code misreads or errors can reduce a read data rate or decrease accuracy in reading decodable indicia from scanned or input data.

SUMMARY OF THE INVENTION

It is an object of the application to provide a scanning apparatus that includes a laser source operable to emit a beam along an axis and illuminate a target. The target includes decodable indicia such as an encoded symbol character such as a printed bar code. A lens assembly in optical communication with the laser source and a scanning apparatus can focus the beam on the target at an object distance, and a detector can receive light of varying intensities scattered from the encoded indicia and convert the light into a first signal. A digitizer converts the first signal to a digital bit stream. A decoder receives the digital data to output, store, or display decoded indicia. The decoder can use print variation measurements to identify misread errors in the decoded symbol.

It is another object of the application to use data misread error identification to increase a read data rate for a bar code reader terminal such as a scanning apparatus or methods thereof.

There is described in one embodiment an indicia reading terminal having an image sensor pixel array incorporated therein, wherein the terminal is operative for decoding of decodable indicia and/or for providing frames of image data (e.g., color image data) for storage, display, or transmission. The terminal can be operative to activate a processing module that can determine decodable indicia data in the image data and identify errors in decodable indicia data.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

DETAILED DESCRIPTION OF THE EMBODIMENTS

Figure 1:
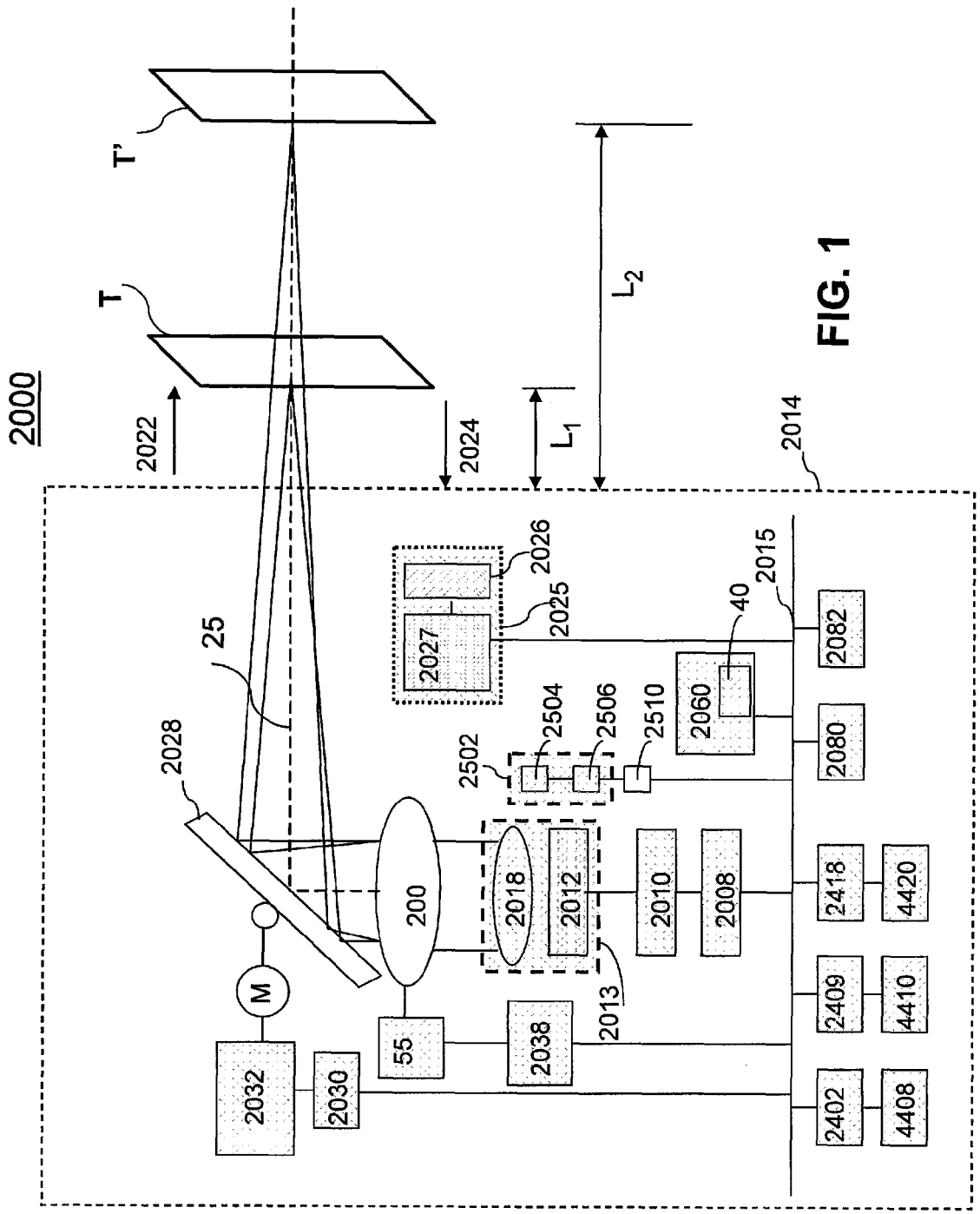
FIG. 1 is a block diagram illustrating a laser scanning based indicia reading terminal.

Referring to FIG. 1, an indicia reading terminal 2000 includes a laser source 2012. The laser source 2012 can emit a laser beam along an optical path, e.g., axis 25. Laser source 2012 can be coupled to laser source control circuit 2010. Light from laser source 2012 can be shaped by optical assembly 2018 (e.g., collimating optics) and optional lens assembly 200. The combination of laser source 2012 and optics 2018 can be regarded as a laser diode assembly 2013. The laser beam travels in an emitting direction 2022 along axis 25 and illuminates a target T, which in one embodiment includes a decodable indicia such as a bar code. A scanning mirror reflector 2028 disposed within the optical path defined by axis 25 oscillates to direct the laser beam across a surface to be scanned. Reflector 2028 can be driven by scan motor, M, which is coupled to control circuit 2032.

The laser beam reflects off the target T and scattered light travels along axis 25 in a receiving direction 2024 back to detector 2026. The scattered light can be aligned or offset from axis 25. In the example where the target T includes a bar code, the incident laser light strikes areas of dark and white bands and is reflected. The reflected light will thusly have variable intensity representative of the bar code pattern. Detector assembly 2025 including detector 2026 and analog to digital converter 2027 can receive the reflected beam of variable intensity, generate an analog signal corresponding to the reflected beam, and convert it to a digital signal for storage into memory 2080 where it can be processed by CPU 2060 in accordance with a program stored in non-volatile memory 2082, provided in a particular example by an EPROM.

For attempting to decode a bar code symbol, CPU 2060 can include a decoder 40 or a plurality of decoder modules to process a digitized signal corresponding to a scanned, reflected, and detected laser beam to determine a spatial pattern. The spatial pattern (e.g., 1D spatial pattern) can be converted to a decoded symbol such as a character or character string (e.g., table lookup). Terminal 2000 can include various interface circuits allowing CPU 2060 to communicate with various circuits of terminal 2000 including interface circuit 2008 coupled to circuit 2010 and system bus 2015, interface circuit 2030 coupled to motor control circuit 2032, and interface circuit 2038 coupled to electrical power input unit 55. Terminal 2000 can also include trigger 4408 which can be actuated to initiate a decode attempt. Manual trigger 4408 can be coupled to interface circuit 2402, which in turn can be coupled to system bus 2015. Terminal 2000 can also include a display 4420 in communication with CPU 2060 via interface 2418 as well as pointer mechanism 4410 in communication with CPU 2060 via interface 2409 coupled to system bus 2015.

Referring to further aspects of indicia reading terminal 2000, terminal 2000 can include electrical power input unit 55 for inputting of energy for changing an optical characteristic of focusing apparatus 100, and therefore changing an optical characteristic (e.g., focal length, plane of optimal focus) of lens assembly 200. In one embodiment, an energy input to lens assembly 200 can be varied to vary a plane of optimum focus of a laser beam that is shaped by optics 2018, 200, 2028. A plane (or distance) of optimum focus of a projected laser beam can be varied between a first distance $L_1$, of optimum focus and a second distance $L_2$ of optimum focus.

Figure 2:
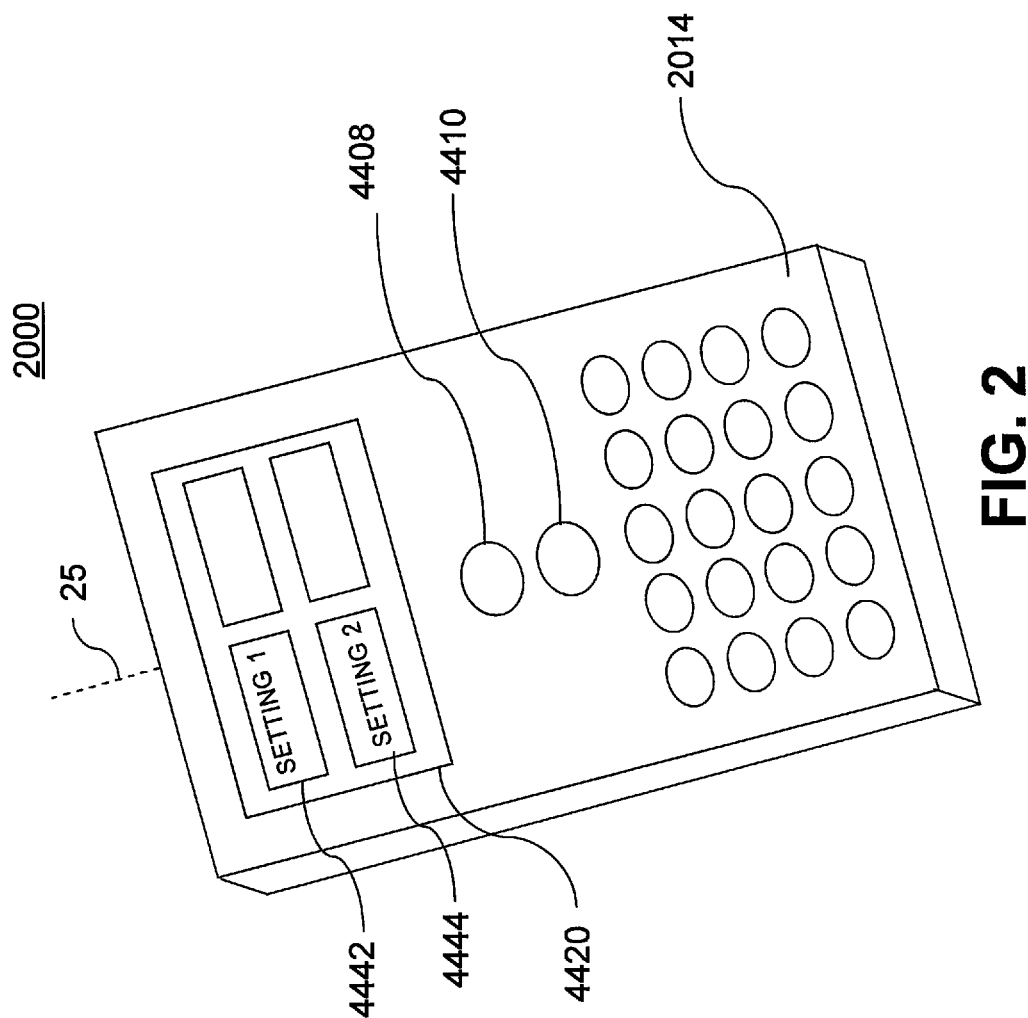
FIG. 2 is a perspective view illustrating an exemplary indicia reading terminal having a hand held housing.

A physical form view of a hand held laser scanning based indicia reading terminal 2000 is shown in FIG. 2. However, embodiments of the application are not intended to be so limited as other physical configurations can be used (e.g., omni-directional bar code readers). Terminal 2000 can include display 4420 and trigger 4408 disposed on a common side of hand held housing 2014. A user interface of terminal 2000 can be provided by display 4420 and pointer mechanism 4410 individually or in combination. A user interface of terminal 2000 can also be provided, e.g., by configuring terminal 2000 to be operative to be programmed. In another embodiment, hand held housing 2014 can be devoid of a display and can include a gun style form factor.

In another aspect, terminal 2000 can be operative to move a lens setting of lens assembly 200 between at least a first plane of optimum focus setting and a second plane of optimum focus setting. Still further, terminal 2000 can be operative to generate at least a first signal corresponding to a first scan with the lens assembly 200 at the first setting or the second setting and a second signal corresponding to a second scan with the lens assembly at the second setting or the first setting, and terminal 2000 can be further operative to attempt to decode a decodable indicia utilizing the first signal and the second signal. The second scan to which the second signal corresponds to can be a successive scan in relation to the first scan or a non-successive subsequent scan in relation to the first scan.

Terminal 2000 can be operative so that terminal 2000 can generate a succession of scans and signals corresponding to the scans when an operator activated read attempt is activated by an operator actuation of a trigger 4408. Terminal 2000 can subject one or more generated signals to a decode attempt and the scanning, signal generating, and decode attempting can continue until a read attempt is deactivated e.g., by a release of trigger 4408 or by a successful decode.

Indicia reading terminal 2000 in a second operator activated configuration can be operative to maintain a lens setting of the terminal at a certain lens setting during a time that the terminal executes an operator activated read attempt of terminal 2000. Terminal 2000 can be operative so that an operator can select between the first and second configurations using the user interface of terminal 2000 by selection of a button 4452 (first configuration), or button 4454 (second configuration) corresponding to the desired configuration.

One task of a laser bar code reader is to collect information about widths of bars and spaces from a coded symbol such as bar codes of a selected symbology. Symbologies vary in structure but each can use patterns of light and/or dark print to encode information. For one-dimensional (1D) bar codes the light and dark print patterns can include the widths of bars and spaces.

For example, one exemplary 1D symbology, the UPC-A/EAN-13/ISBN-13 bar code has 13 digits, where the last digit is a checksum computed from the first 12 digits. The EAN-13 bar code starts by a left-hand guard bar A (black-white-black) and ends with a right-hand guard bar E (black-white-black) Between the guard bars, there are two blocks B and D of six (6) encoded digits each, separated by a center bar C (white-black-white-black-white). A module is the smallest or narrowest unit. Bars and spaces can cover one to four modules of the same color (e.g., black or white). Each digit is encoded using seven (7) modules (e.g., two bars and two spaces with a total width of seven (7) modules). The bars and spaces used to encode a digit or character as an encoded symbol are referred to generally as "elements." The width of a complete EAN-13 bar code is 59 black and white elements (3+6*4+5+6*4+3) that includes 95 modules (3+6*7+5+6*7+3).

As described herein, in the example where the target T includes a bar code, the incident laser light strikes areas of dark and light (e.g., white) bands and is reflected. The reflected light will thusly have variable intensity representative of the bar code pattern. Noise from a number of different sources can corrupt the signal (e.g., an analog signal) received by the terminal 2000 before the analog signal can be digitized. Accordingly, incorrect bar/space widths for the bar code can be reported to the terminal 2000. Without sufficient accuracy checks, such errors can cause incorrect decodes by the terminal 2000 including misread decode errors. Misread decode errors cause the transfer of incorrect information that can be considered worse than an inability to read/decode the digitized signal.

As described herein, terminal 2000 can be provided with the decoder 40 to decode decodable indicia. In one embodiment, the decoder can be a separate module operationally coupled to CPU 2060 through bus 2015. In one embodiment, the decoder 40 can include all or part of the detector assembly 2025. In one embodiment, the decoder 40 can be implemented using hardware, software, or combinations thereof. Further, the decoder 40 can include a plurality of decoder units. The decoder 40 can include a sub-decoder circuit for each type of decodable indicia (e.g., EAN-13). In one embodiment, the decoder 40 can include a decode indicia misread detector.

In terminal 2000, after 1D analog data is digitized the result is a set of varying-width bars and spaces (e.g., digitized data) that can be provided to the decoder 40 including a decodable indicia misread detector capability. According to embodiments of systems, apparatus and/or methods of the application, contained within decodable indicia data (e.g., digitized data) is information about the quality of the print of the printed decodable indicia (e.g., bar code). Embodiments of systems, apparatus, and/or methods to can modify the digitized data to provide a capability for terminal 2000 to identify decode misread errors in the digitized data and/or the printed decodable indicia.

In one embodiment, by measuring variations in the digitized data representing the printed bar code data and modifying the measured print variations, embodiments of the application can make a determination whether the digitized data is likely to include misread errors, which can include errors from misprinted bar codes or errors occurring in the reading (e.g., noise including EMI noise, ambient noise, random sourced noise, or the like) of the bar code. In one embodiment, reading the bar code includes generating analog data representing the printed bar code.

When the determination is that a misread is included in the digitized data representing the decoded printed bar code, the terminal 2000 can respond appropriately. For example, in one embodiment terminal 2000 can reject the printed bar code data including a misread and process another scanned representation of that printed bar code, (e.g., within a single operation of the trigger 4408). Alternatively, terminal 2000 can prompt the operator to reread the printed bar code. In one embodiment, the printed bar code data including the misread can be processed for correction.

An embodiment of a method of operating a bar code reader terminal according to the application will now be described. The method embodiment shown in FIG. 3 can be implemented in and will be described using a terminal system shown in FIG. 1; however, the method embodiment is not intended to be limited thereby.

Figure 3:
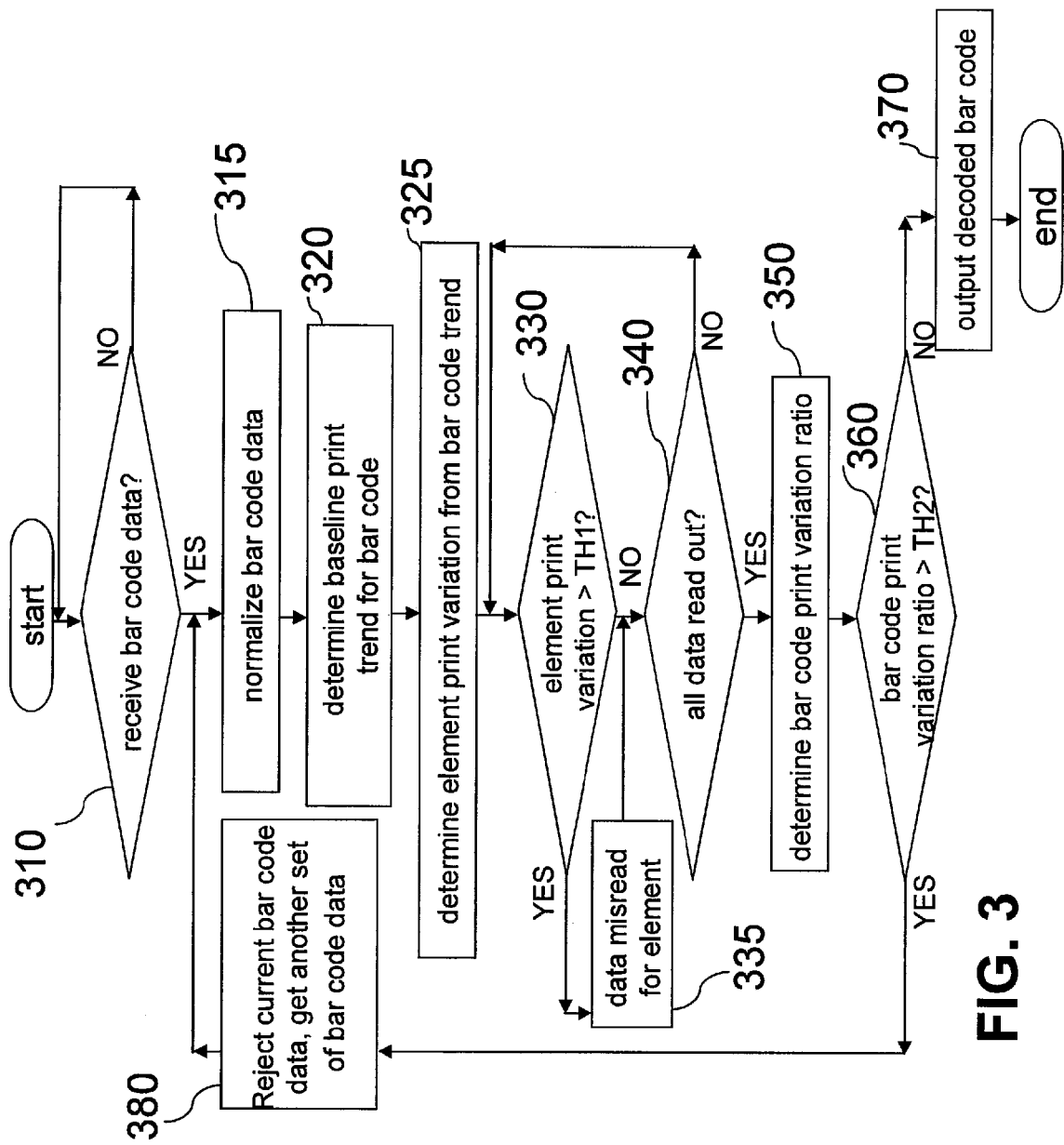
FIG. 3 is a flow chart diagram illustrating an exemplary embodiment of a method of processing decodable indicia data according to the application.

As shown in FIG. 3, after a process starts, it can be determined whether a terminal has input or received decodable bar code data such as a 1D printed bar code data (operation block 310). For example, decodable bar code data can be received as a result of a trigger 4408 operation. In one embodiment, the decodable indicia data is digitized; however, when analog data representing the printed bar code is received, an analog to digital converter (ADC) or the like can be used to digitize the data as known to one skilled in the art. In one embodiment, the condition(s) in operation block 310 can be tested periodically, repeatedly, continuously, upon operator action or responsive to sensed criteria.

When the decodable indicia data such as bar code data has been received, a symbology type for the bar code can be determined. For example, the type of bar code symbology can be selected by an operator, provided with the raw data, or determined from the data itself. In one embodiment, bar code data can be sequentially processed by a plurality of sub-decoder circuits until a corresponding decoded result is used to identify a symbology type. Typically, an entire bar code worth of data is received. For one bar code example described herein, the symbology is EAN 13, and accordingly, the full length of the code is 59 bars and spaces that total 95 modules wide.

Figure 4:
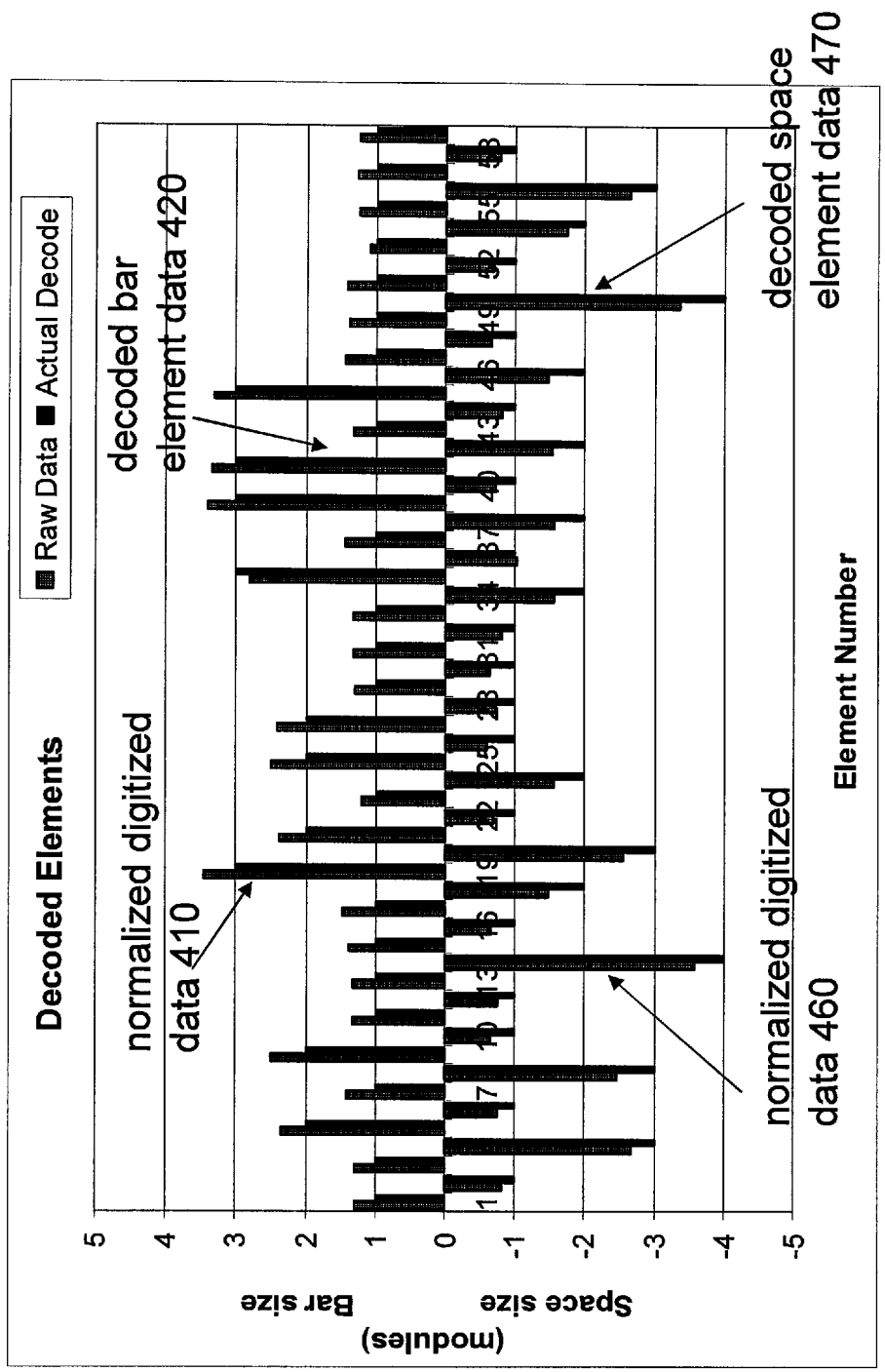
FIG. 4 is a diagram illustrating exemplary bar and space width data of one symbology type printed bar code.

Then, digitized data (e.g., raw data) can be normalized (operation block 315). In one embodiment, raw digitized data, which can be delivered directly to a decoder of terminal 2000, is scaled to a particular clock count in the signal processor. For example, a single element in the bar code may have a width of a prescribed number of counts (e.g., 50 counts, 70 counts. As described herein a module in a bar code can be a narrowest element that can be used to represent a space or a bar in the bar code symbology. In one embodiment, dividing the digitized data by the average module size can provide exemplary normalized data. Alternatively, the digitized data could be divided by the nearest multiple of a prescribed clock count for the module width. FIG. 4 is a diagram that shows normalized data (e.g., digitized) for the printed EAN 13 bar code example.

A printed decodable indicia or encoded bar code can have a measurable print variation. Such measurable print variation can be caused, for example, by some amount of print distortion. Examples of print distortion include an over-print distortion or under-print distortion. An example of over-print distortion is ink-bleeding in paper that results in printed bars that are wider than intended and spaces that are narrower than intended in the printed bar code. An example of under-print distortion is printed bars that are narrower than intended and spaces that are wider than intended in a printed bar code.

FIG. 4 shows exemplary bar and space width data of the EAN 13 printed bar code with overprint distortion. As shown in FIG. 4, most of the normalized data of bar code elements representing bars can be seen to be larger than its corresponding decoded data (e.g., normalized data 410 is greater than decoded (e.g., ideal) data 420). Further, most of the normalized data for spaces can be seen to be smaller than its corresponding decoded data (e.g., normalized data 460 is less than decoded (e.g., ideal) data 470).

Figure 5:
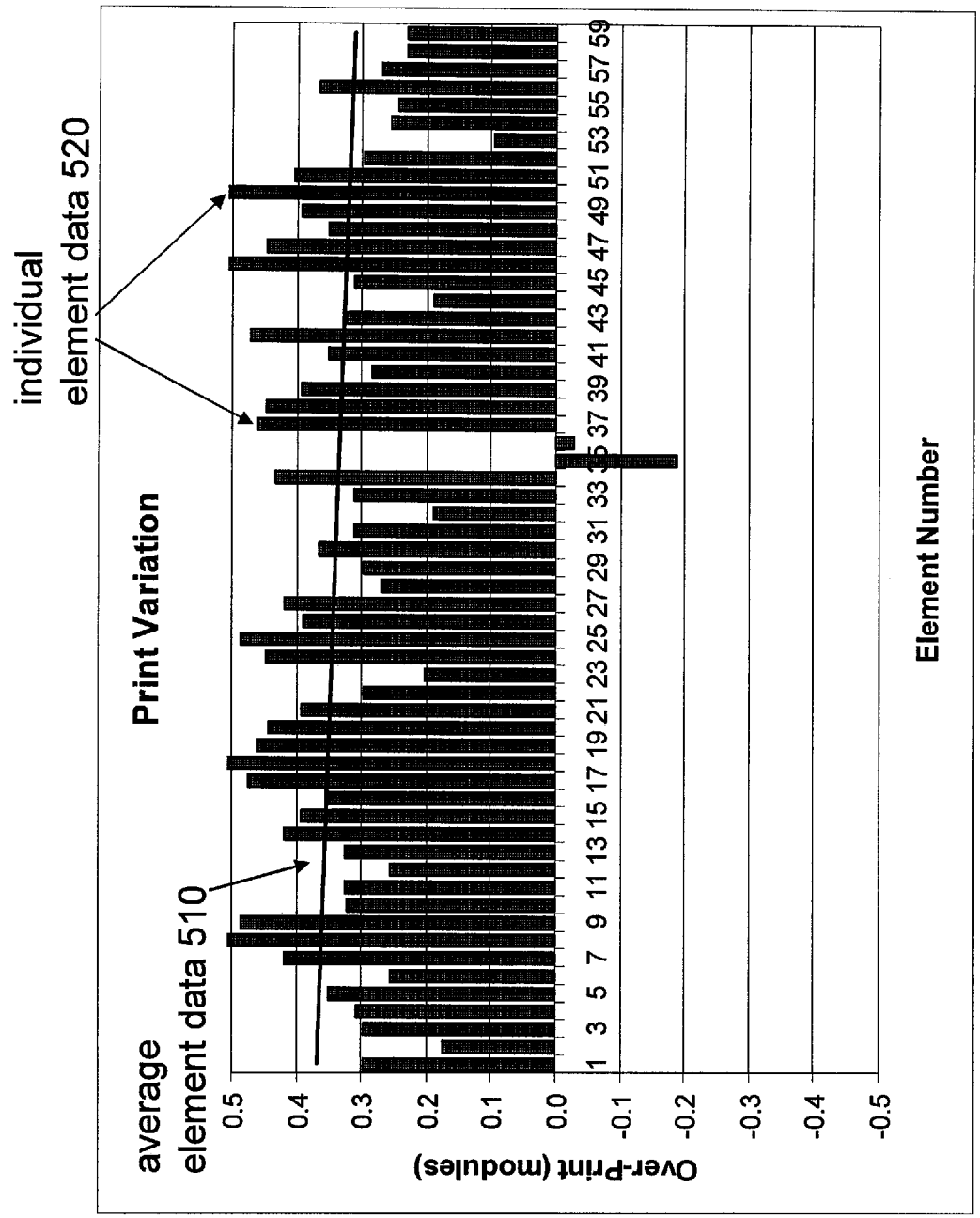
FIG. 5 is a diagram illustrating exemplary print trend measurement for the exemplary printed bar code of FIG. 4.

Print trend(s) of the printed bar code data can be measured or determined (operation block 320). Trend line 510 in FIG. 5 is a linear regression trend line of the print trend across the EAN 13 bar code. Thus, the trend line 510 can be considered one example of an overall/partial baseline measured print trend for the entire bar code. For example, a printer may not have constant properties as an entire page is fed through and printed. Trend line 510 is a linear regression trend line and can be considered a moving average; however, embodiments of the application are not intended to be so limited. For example, higher order trend lines, segment moving averages could be determined for a plurality of exclusive or overlapping sections of the entire bar code or weighted moving averages can be used for trend line 510. In one embodiment, a moving or weighted average can use 10, 20, 40 or more elements. In one embodiment, a moving or weighted average can use 10%, 20%, 50%, or more than 70% of the elements.

As shown in FIG. 5, the exemplary bar and space width data of an EAN 13 code shows a significant over-print distortion tendency, which is averaging more than 0.3 modules. However, elements 35 and 36 are both under-printed.

Print variation measurement(s) of each element can be determined with respect to the baseline print variation of the printed bar code (operation block 325). For example, each individual bar code element print variation measurement (e.g., 520) can be determined and then compared to the trend line 510. FIG. 5 also illustrates one measure of print variation of each individual bar code element. In one embodiment, decoded values for bar code elements can be subtracted from the normalized data for bar code elements as one exemplary measurement of print variation for each element in the printed bar code. Although individual element print variation such as over-print and under-print are, in and of themselves, not an indication of a likelihood of misread or likelihood of an error with the decoding process, a comparison and/or measured variation of the individual elements' bar code data to an overall trend (e.g., trend line 510) of the printed bar code data (e.g., all or a significant percentage) can be used to identify or be indicative of data misread in a decoding process according to embodiments of the application.

Figure 6:
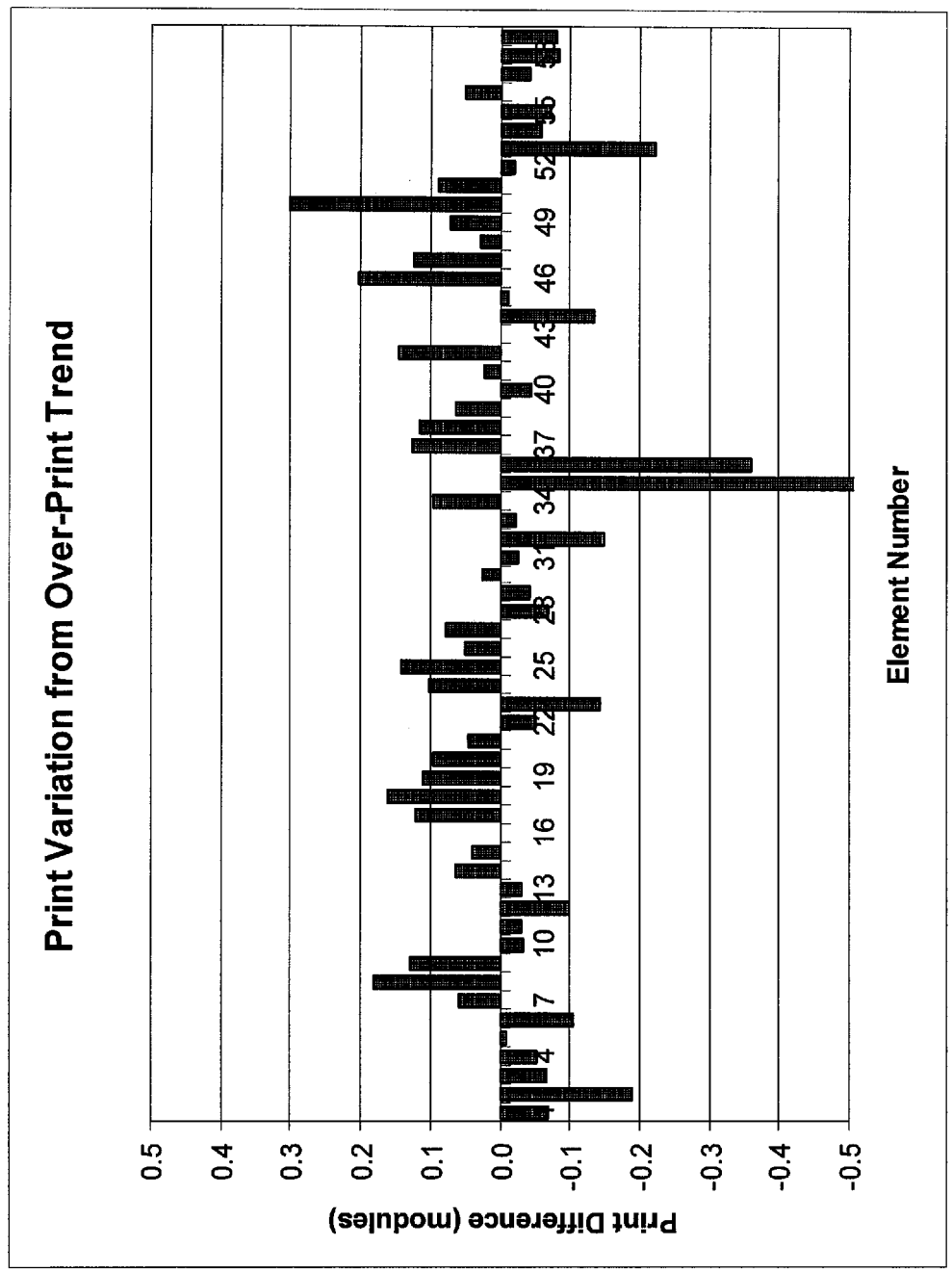
FIG. 6 is a diagram illustrating exemplary print variation measurements for each element of the bar code of FIG. 4 measured from an exemplary baseline print level.

The printed bar code data can be adjusted to set the overall trend of the printed bar code data to zero, as graphically shown in FIG. 6. Thus, FIG. 6 is a diagram that illustrates an exemplary representation of individual element print variation data as measured from the trend line 510 in FIG. 5. The data in FIG. 6 can provide a representation of how much each individual element bar code (e.g., print measurement) can differ from a print characteristic representative of error free print variation measurements in the printed bar code data.

The individual element print measurement data can be translated or modified to make a determination of whether the digitized data representative of the bar code includes evidence that indicates that the bar code might have been decoded/read incorrectly (e.g., a data misread error). In one embodiment, such a misread determination can be considered a misread test, which can take more than one form. The misread determination can identify misread errors in the digitized data comprising the bar code print measurement data. For example, a misread determination can be performed by identifying individual print element measurement outliers present in the digitized data for the printed bar code data (operation blocks 330, 335, 340). For the EAN 13 bar code example, the standard deviation of the data (e.g., module print difference data) in FIG. 6 is 0.132 modules. When two standard deviations are used as the bar code misread error, threshold TH1, three elements in FIG. 6 fall outside that range, elements 35, 36, and 50. For example, a normal distribution (e.g., ideal distribution) having a population of 59 elements would result in 2.68 elements (e.g., on average) falling outside of two standard deviations. Further, when three standard deviations are used as the bar code print measurement outlier threshold TH1, only element 35 in FIG. 6 falls outside that range. For comparison, in a normal distribution within a population of 59 the expectation would be 0.16 elements falling outside three standard deviations.

The number of elements having print variation measurements that fall outside a prescribed range can be transformed to a value that can provide a determination of whether misread errors are present in digitized data representing the bar code. In one embodiment, a ratio of the total number of elements having print variation measurements outside the prescribed range divided by the number of expected measurements can determine a bar code print variation ratio (operation block 350).

In one embodiment, operation blocks 330, 335, 340 can be implemented by performing an integration or average of the element print measurement variation in the digitized data over a range of thresholds (e.g., values for TH1). Table 4 shows an average of six calculations using values for TH1 from two to three standard deviations.

TABLE 4

Misread Measurements

MISREAD MEASUREMENTS
Min. Standard Dev. Threshold: 0.08

| | Std. Dev.'s | | | | | | |
|---|---|---|---|---|---|---|---|
| | 2 | 2.2 | 2.4 | 2.6 | 2.8 | 3 | Sum |
| Expected Outliers: | 2.68 | 1.64 | 0.97 | 0.55 | 0.30 | 0.16 | 6.3 |
| Counted Outliers: | 3 | 3 | 2 | 2 | 1 | 1 | 12.0 |

As shown in Table 4, the number of bar code print measurement value outside the corresponding thresholds (e.g., TH1) counted in the range from two to three standard deviations is nearly twice the number that would be expected (12.0/6.3=1.9). The ratio of 1.9 indicates that more errors have occurred than would be expected, but that does not yet delineate whether the bar code reading is likely a misread. This value or ratio 1.9 must be compared to a corresponding decoded bar code acceptance threshold (e.g., TH2) (operation block 360). In one embodiment, the decoded bar code acceptance threshold TH2 can be determined by corresponding symbology type. In one embodiment, the decoded bar code acceptance threshold TH2 can be determined empirically. Experimentally, a threshold of 1.7 was an operational indicator for digitized data representative of the EAN-13 symbology. The threshold TH2 can be selected such that decodes higher than TH2 likely contain a misread, and decodes lower than TH2 are likely not to include a misread. Also, test data can be processed according to embodiments of the application (e.g., FIG. 3) to verify the desired or prescribed level of false positives. An acceptable trade off between misread detection and false positives can be determined individually for each application of the terminal 2000.

When a total of print element measurement outliers for the digitized data representing the printed bar code is greater than a decoded bar code acceptance threshold level (operation block 360), the digitized data can be determined to include a data misread. As shown in FIG. 3, when the determination is the printed bar code data includes a data misread (operation block 360 YES), another representation of printed bar code (e.g., digitized data) can be obtained (operation block 380) and control returns to operation block 315. Otherwise, the decoded printed bar code representation is output, for example, to a user, to a display, to a storage medium (operation block 370) and the process ends. Alternatively, the printed bar code data with the data misread can be discarded, and the same printed bar code can be rescanned by terminal 2000.

In one embodiment, TH2 can be a range so that decodes below TH2 do not include an error, decodes above TH2 include an error, and decodes resulting in values that fall within the TH2 range are confirmed or reprocessed. For example, a decode can be confirmed by processing another set of digitized data representative of the same printed bar code and comparing the second (e.g., subsequent) result to the TH2 range (and/or the first result).

The example standard deviation threshold of 0.08 shown in Table 4 can be used in the case of very well-printed codes. When the print quality of a code is very good on average, it only takes a few small errors to create outliers, so a lower or minimum standard deviation threshold can be established to ensure that actual significant errors are counted.

In one embodiment according to the application, alternative representations of the digitized data representative of a printed bar code can be used to detect or determine the likelihood of a misread error. For example, a first representation of digitized data representative of a printed bar code can include all print variation measurement data (e.g., FIG. 6). A second representation of digitized data representative of a printed bar code can exclude a subset of print variation measurement data and can be used to indicate the presence of a misread error. In one embodiment, at least one outlier data or a subset of outlier data (e.g., print variation measurement>TH1) can be removed and then a determination using the decoded bar code acceptance level (e.g., TH2) can be performed or processed.

Figure 7:
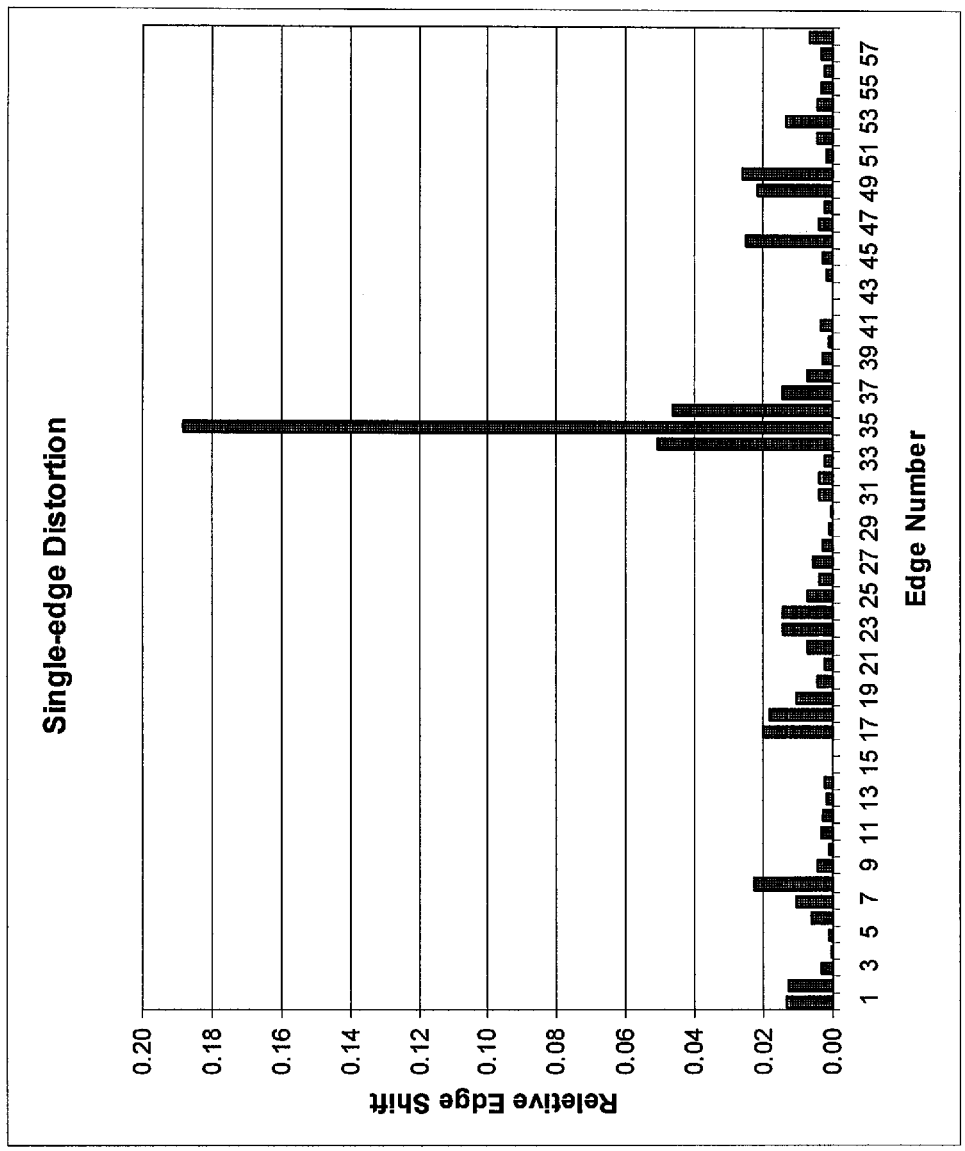
FIG. 7 is a diagram illustrating exemplary print variation measurements for bar and space edge data for each element of the bar code of FIG. 4.

Embodiments according to the application are not intended to be limited to misread determination for decodable indicia described with respect to FIG. 3. Alternative print variation measurements can be used to identify bar code misreads. For example, misread detection can use some form of edge distortion detection (e.g., edge print measurement variation), for example, using normalized digitized bar code width data (e.g., FIG. 4). FIG. 7 is a diagram that illustrates the data from FIG. 4 transformed by a single edge detection formula of ABSOLUTE VALUE (ELEMENT$_N$*ELEMENT$_{N+1}$). As shown in FIG. 7, misread error of edge 35 (between elements 35 and 36) stands out and can be identified.

Each type of measurement used to determine print variation should be analyzed with respect to the corresponding end use or application. For example, in a single edge detection print variation measurement, when two adjacent edges shift similar amounts, the error can be missed (e.g., the indicating spike in FIG. 7 can be completely lost) by terminal 2000.

Further, in one embodiment, combinations of misread error detection processes or circuits can be used. Combinations of embodiments of the application can result in a higher likelihood of misread detection in decoding printed bar codes.

Embodiments of the application have been described herein with reference to a UPC-A/EAN 13 1D bar codes. However, embodiments of the application are not intended to be so limited. For example, embodiments of the application may be configured to use any one-dimensional code formed of different width bars and spaces or two-dimensional codes, which can be analyzed using print measurement variation. In one embodiment, symbology types can include exemplary codes such as, but not limited to, a UPC code, a Code 39, or PDF 417 symbology. Embodiments of the application can improve misread detection in bar code reader terminals (e.g., laser or image sensor) and methods thereof relative to print variation measurement.

Embodiments of the application have been described herein with reference to a complete single bar code. However, embodiments of the application are not intended to be so limited. For example, embodiments of the application may be configured to use segments of bar codes or a partial bar code once a corresponding symbology and decode (partial) has been completed. However, as a segment of the printed bar code becomes shorter, reliability in the results can be decreased.

Embodiments of the application have been described herein with reference to a single corresponding detection algorithm for a multiple types of bar code symbology. However, embodiments of the application are not intended to be so limited. For example, embodiments of the application may be configured to use different detection algorithms for each type of bar code symbology or a plurality of detection algorithms (e.g., in combination) for each identified type of bar code symbology.

Although, exemplary embodiments were described using a laser scanner terminal, the application is not intended to be limited thereto. For example, bar code reader terminals can include a pen type reader, laser scanner, CCD readers, 2D imaging scanner, image sensor imaging terminals, a bar code reader using one-dimensional image sensor array, omni-directional bar code scanners and any similar type terminals operative to generate print measurement data form encoded symbols, bar codes or decodable indicia. Further, the bar code reader terminals can include retro reflective terminals.

A small sample of systems methods and apparatus that are described herein is as follows:

A1. A method for operating a scanning apparatus comprising:
  providing a laser light source, a focusing apparatus, a detector, a digitizer, and a decoder;
  passing a laser beam through the focusing apparatus along an axis illuminating a target comprising an encoded symbol;
  scanning the encoded symbol;
  receiving scattered light from the target and converting the received scattered light to a first signal;
  converting the first signal to a second signal comprising a digital data stream;
  decoding the second signal into a decoded symbol;
  determining whether the decoded symbol includes a data misread error, where the determining comprises,
    generating print variation measurement data for the encoded symbol from the second signal and the decoded symbol, and
    transforming deviations on individual element print variation measurements for elements comprising the encoded symbol relative to baseline print measurements for the encoded symbol to identify when the decoded symbol includes the data misread error; and
  outputting the decoded symbol that does not include the data misread error for display or storage.

B1. A method of processing data for a terminal comprising:
  receiving encoded bar code data;
  decoding the received encoded bar code data to a first decoded representation; and
  determining when the first decoded representation includes a data misread,
    wherein said determining comprises:
    normalizing the encoded bar code data,
    determining print variation of each individual element of the received normalized encoded bar code data,
    determining a combined print variation measurement for the received encoded bar code data,
    determining a first set of element measurements greater than a first threshold using a difference between the individual element print variation and the combined print measurement for the encoded bar code, and
    determining a misread print variation value by comparing the first set to an error noise print variation level,
  identifying said data misread when the misread print variation value is greater than a misread threshold; and
  rejecting said first decoded representation when said data misread is identified.

C1. A terminal comprising:
  a decoder for decoding decodable indicia received by the terminal, the decoder comprises:
    a first circuit to aggregate an amount of individual element print measurement divergence for a plurality of elements in the decodable indicia; and
    a second circuit to identify a misread error when said aggregate element print measurement divergence is greater than an acceptance threshold for a symbology type of the decodable indicia.

In one embodiment, a bar code reader terminal can include a hybrid monochrome and color image sensor pixel array, where the image sensor pixel array has a first subset of monochrome pixels and a second subset of color pixels. Hybrid monochrome and color image sensor pixel array can include pixels arranged in a plurality of rows of pixels and can include a first subset of monochrome pixels devoid of color filter elements and a second subset of color pixels including color filter elements. Such color sensitive pixels can be disposed at spaced apart positions of an image sensor pixel array and can be disposed at positions substantially uniformly (e.g., period P=2) or not uniformly throughout an image sensor pixel array. In one embodiment, the spaced apart color pixels of the image sensor array, though spaced apart, can follow a pattern according to a Bayer pattern.

While the present application has been described with reference to a number of specific embodiments, it will be understood that the true spirit and scope of the application should be determined only with respect to claims that can be supported by the present specification. Further, while in numerous cases herein wherein systems and apparatuses and methods are described as having a certain number of elements it will be understood that such systems, apparatuses and methods can be practiced with fewer than the mentioned certain number of elements. Also, while a number of particular embodiments have been set forth, it will be understood that features and aspects that have been described with reference to each particular embodiment can be used with each remaining particularly set forth embodiment. For example, features or aspects described using FIG. 3 can be applied to embodiments using FIG. 7.

The invention claimed is:

1. A method for operating a scanning apparatus comprising:
  providing a laser light source, a focusing apparatus, a scanning apparatus, a detector, a digitizer, and a decoder;
  passing a laser beam through the focusing apparatus along an axis illuminating a target comprising an encoded symbol;
  scanning the encoded symbol;
  receiving scattered light from the target and converting the received scattered light to a first signal;

converting the first signal to a second signal comprising a digital data stream;

decoding the second signal into a decoded symbol;

determining whether the decoded symbol includes a data misread error, where the determining comprises, generating print variation measurement data for the encoded symbol from the second signal and the decoded symbol, and transforming deviations on individual element print variation measurements for elements comprising the encoded symbol relative to baseline print measurements for the encoded symbol to identify when the decoded symbol includes the data misread error; and outputting the decoded symbol that does not include the data misread error for display or storage.

2. The method of claim 1, comprising rejecting the decoded symbol including the data misread error.

3. The method of claim 1, where said generating print variation measurement data comprises:

normalizing element width data of a 1D bar code by dividing by an average module size; and subtracting the normalized element data from data representing the decoded symbol.

4. The method of claim 1, where said transforming deviations on individual element print variation measurements comprises:

determining a baseline print level for the encoded symbol by averaging individual element print measurements for the encoded symbol;

calculating an individual element difference values by subtracting element print variation measurements from the baseline print level;

setting a total encoded deviations value by counting a number of said difference values in the encoded symbol greater than a first threshold measurement; and comparing said total encoded deviations value to a second threshold value, the decoded symbol to include the data misread error when the total encoded deviations value is greater than the second threshold.

5. The method of claim 4, wherein the averaging comprises a moving average of elements, a weighted moving average or linear regression trend line of the print measurements across the encoded symbol.

6. The method of claim 4, where the first threshold value is representative of a print measurement variation that is a statistical outlier relative to a noise distribution in the encoded symbol data.

7. The method of claim 4, where the second threshold value is representative of an acceptance level corresponding to a symbology type of the encoded symbol.

8. The method of claim 7, wherein the acceptance level is empirically determined according to a bar code symbology type, and where the encoded symbol is a 1D bar code wherein the ID bar code is an UPC-A/EAN 13 code having 59 bars and 95 elements.

9. The method of claim 4, wherein the total encoded deviations value is determined by averaging counted outlier data over a range of first threshold values.

10. The method of claim 4, wherein the total encoded deviations value is representative of integrating outlier difference values over the range of first threshold values.

11. A method of processing data for a terminal comprising:

receiving encoded bar code data;

decoding the received encoded bar code data to a first decoded representation; and determining when the first decoded representation includes a data misread, wherein said determining comprises:

normalizing the encoded bar code data, determining print variation of each individual element of the received normalized encoded bar code data, determining a combined print variation measurement for the received encoded bar code data, determining a first set of element measurements greater than a first threshold using a difference between the individual element print variation and the combined print measurement for the encoded bar code, and determining a misread print variation value by comparing the first set to an error noise print variation level, identifying said data misread when the misread print variation value is greater than a misread threshold; and rejecting said first decoded representation when said data misread is identified.

12. The method of claim 11, wherein the print variation of each individual element includes an edge measurement or a width measurement of the individual elements.

13. The method of claim 11, wherein the determining a combined print variation measurement for the received encoded bar code data comprises using data of the first decoded representation.

* * * * *